United States Patent [19]

Angelbeck

[11] Patent Number: 4,657,096

[45] Date of Patent: Apr. 14, 1987

[54] LOAD BAR WEIGHING SYSTEM

[75] Inventor: John J. Angelbeck, Colorado Springs, Colo.

[73] Assignee: Kaman Sciences Corporation, Colorado Springs, Colo.

[21] Appl. No.: 678,642

[22] Filed: Dec. 6, 1984

[51] Int. Cl.⁴ .................... G01G 19/02; G01G 19/04
[52] U.S. Cl. ................................. 177/163; 177/134; 177/DIG. 8
[58] Field of Search ................. 177/134, 163, DIG. 8

[56] References Cited

U.S. PATENT DOCUMENTS

| | | | |
|---|---|---|---|
| 3,159,227 | 12/1964 | Raskin et al. | 177/DIG. 8 |
| 3,592,278 | 7/1971 | Shumaker et al. | 177/163 X |
| 3,741,327 | 6/1973 | Nordstrom et al. | 177/163 |
| 3,746,111 | 7/1973 | Berthiaume et al. | 177/163 |
| 4,160,204 | 7/1979 | Holmgren et al. | 324/207 |
| 4,503,922 | 3/1985 | Brosh et al. | 177/210 EM |

OTHER PUBLICATIONS

The Condensed Chemical Dictionary, 9th Edition, G. G. Hawley, editor, Van Nostrand Reinhold Co., New York, pp. 391 and 840.

Insulation/Circuits, "Plastic Materials for Molding and Extrusion", Jun./Jul. 1970, pp. 137–139.

Primary Examiner—E. A. Goldberg
Assistant Examiner—Patrick W. Foster
Attorney, Agent, or Firm—Max L. Wymore

[57] ABSTRACT

A load measurement bar is attached to an isolated section of railroad track rail at two locations along the neutral axis of the rail. The bar assembly contains displacement sensors to measure the bending slope of the rail relative to the bar to provide a signal output directly proportional to load.

13 Claims, 20 Drawing Figures

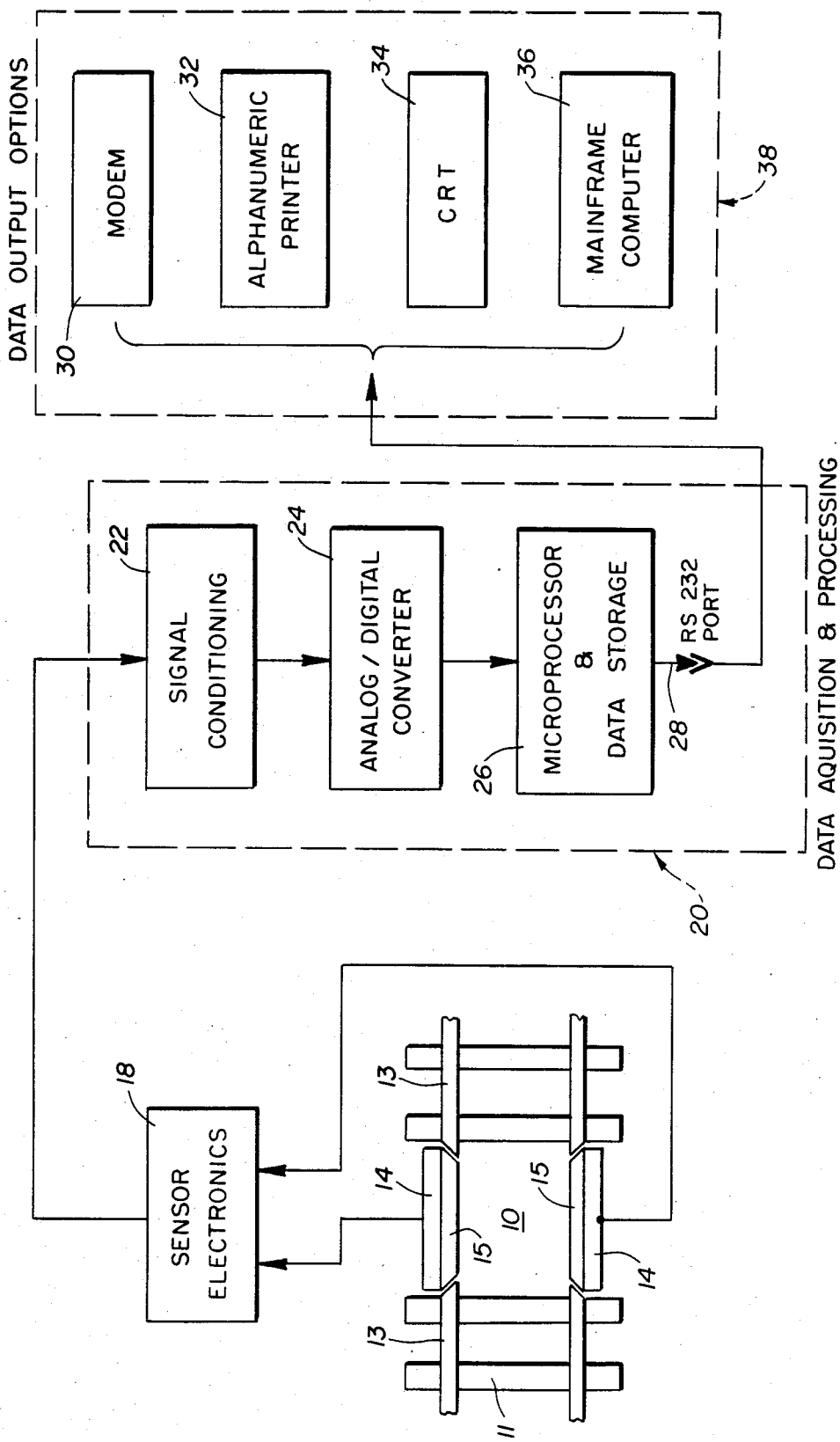

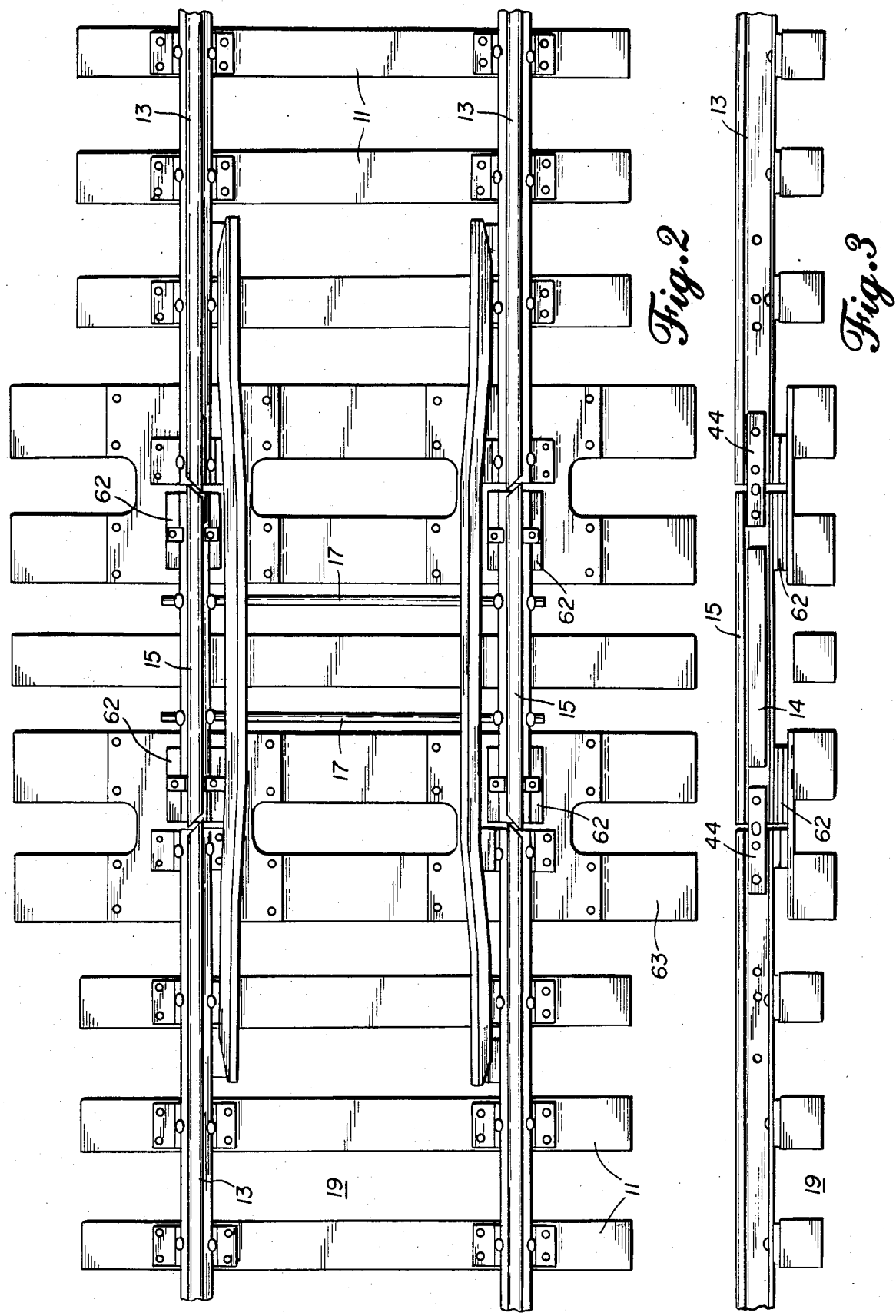

RAIL DEFLECTION VS. TRACK CONDITIONS AND MULTIPLE LOADING

TYPICAL OUTPUT OF MEASUREMENT BAR SENSORS

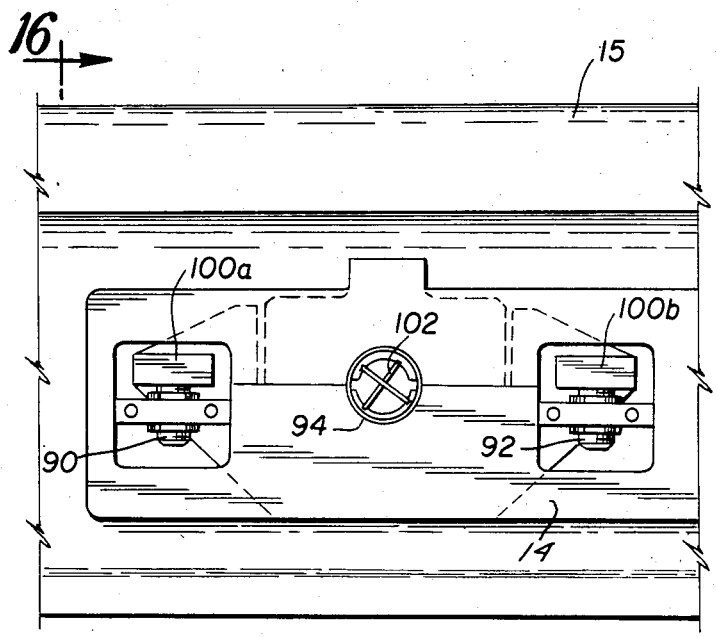
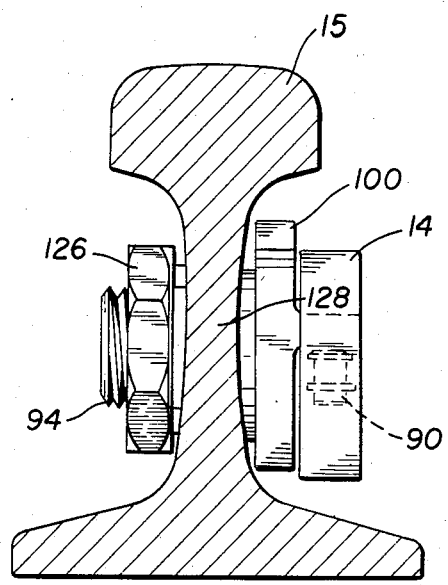
Fig.15     Fig.16
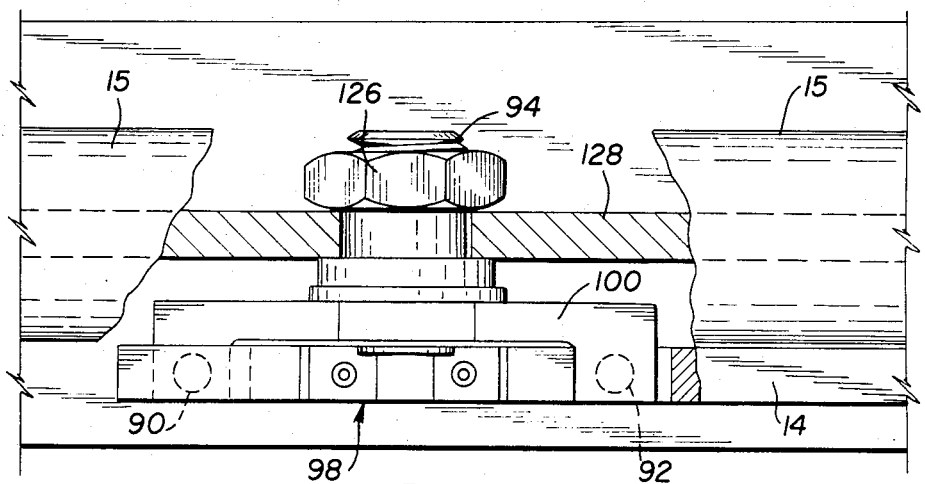
Fig.17

LOAD BAR WEIGHING SYSTEM

FIELD OF INVENTION

An application of the invention is directed to the in-motion measurement of individual wheel loads of railroad cars. By measuring individual wheel loads, a variety of information can be obtained and processed by a microprocessor based data acquisition system. This information includes load imbalance (lateral and longitudinal) for safety purposes, total consist tonnage for locomotive power allocation, and car weights for accounting purposes.

BACKGROUND OF THE INVENTION

Weighing of railroad cars can be accomplished in either a static car-by-car manner, or in a dynamic in-motion manner. Typically, a large percentage of cars are weighed in a static manner on platform scales.

Mostly when railroad cars are weighed, it is primarily for accounting purposes. Although there are other essential reasons for weighing railroad cars, for example load distribution versus safety purposes, it is usually not practical to do so because of the cost and delay involved. Typically, the weighment of cars includes only those which are absolutely necessary.

There are many reasons for this. First of all, conventional platform scales are costly to install and maintain. Thus, the number of scales is limited and typically impose significant delays and cost for those cars which must be routed to them. Depending on the length of the scales and the railroad car, static weighing is accomplished by either a single draft, weighing operation, or multiple drafts. In either case, each weighment requires every car to be properly positioned on the scale platform and uncoupled from the consist, prior to weighing. Obviously, if many cars are involved, this operation is a costly and time consuming process.

Although load imbalance of railroad cars has not been necessarily considered a serious problem in the past, it is becoming important to the safety and operation of new Intermodel railroad equipment such as truck trailers on flatcars, container cars and the like. Both longitudinal, end to end, and lateral, side to side, load imbalance can affect the performance characteristics of railroad cars. The most serious, of course, results in a derailment.

Most platform scales should be capable of providing longitudinal imbalance information if each end of a car is individually weighed, but none would be able to provide lateral imbalance information as this requires each wheel of a car to be weighed separately.

Some pertinent patents are of interest. U.S. Pat. No. 3,159,227 is directed to a "Weighing Apparatus" for weighing moving loads such as railroad vehicles moving over railroad tracks. The device includes a weighing beam or rail whose strain or downward deflection as the load moves thereover is proportional to the weight of the load and is measured by any suitable means, such as strain gauges or load cells. This patent provides means supporting a weigh rail at spaced locations which permit maximum freedom of movement of the weight rail or beam during vertical deflection thereof by a load moving over a rail or beam in order that the deflection of the weigh rail not be effected by extraneous strains or forces and be proportional only to the weight of the load. The support means includes a pair of shafts rigidly secured to opposite ends of the weigh rail and resting on a rigid surface whereby the shafts may rotate or roll on the rigid surface. The shafts are rotatably mounted in housings having resilient means for permitting limited movement of the shafts toward and away from each other on the rigid surface and wherein the housings engage the shafts to prevent lateral displacement of the weigh rail.

U.S. Pat. No. 3,153,460 is directed to a "Weighing Apparatus" for weighing moving loads such as railroad cars moving along railroad tracks. The patent teaches the use of an isolated track for the weighing function to avoid the effects of expansion and contraction of the track rails. The weigh rail assembly is secured to a base between adjacent ends of spaced track rails to permit a degree of longitudinal freedom, again to avoid the effects of contraction and expansion. The isolated weigh rail is rigidly secured at its opposite end portions with the intermediate portion being free to deflect vertically downward as a load moves over the weigh rail. A weigh rail deflection sensing means is mounted in operative engagement with the weigh rail for detecting and measuring the deflection of the weigh rail. Other U.S. patents of interest are:

U.S. Pat. Nos. 2,764,399; 3,446,299;
2,914,310; 3,835,945;
3,004,152; 4,049,069;
3,009,056; 4,094,367;
3,063,635; 4,445,581;
3,284,619

An object of the present invention is to provide a new and improved weighing system for weighing moving loads, such as railroad vehicles moving over railroad tracks.

A further objective of the present invention is to provide a new and improved weighing system that is both economical, fast and easy to use.

A still further object of the present invention is to provide fast weighing of entire trains in motion.

A still further object of the present invention is to provide a weigh rail support arrangement and a load sensing arrangement which permits an automated weighing system providing both longitudinal and lateral load imbalance information.

A still further object of the present invention is to provide a new and improved technique for measuring loads on structural members.

Another important object of the present invention is to provide an inexpensive, uncomplicated, rapid weighing system that is easily installed, calibrated and monitored capable of providing both longitudinal and lateral load imbalance information.

The high cost of conventional weighing systems limits the number of units that can economically be placed in service. The relatively low cost of the present invention makes it cost effective to deploy multiple systems at multiple locations. This attribute in effect allows a railroad to bring the scale to the car rather than the car to the weighing system, and delay trains while cars are switched out and routed to remote scales.

Conventional platform scales require that each car be uncoupled from the train and individually weighed, either in single or multiple drafts. Considerable time and expense is required to weigh a complete train and additional per diem charges due to delays must be added to the direct cost of weighing. Thus, it is not often cost effective to weigh all trains. Considerable revenue can be lost due to overweight cars resulting from inaccurate or estimated tonnage.

With the load bar weighing systems according to the present invention entire trains can be rapidly weighed in-motion while routinely passing through a switch yard. The resulting data is immediately available for correcting dangerous load imbalance conditions and/or determining locomotive power required. Individual car weights can be automatically transferred to a main computer for processing. Another unique feature of the present invention is the capability of the system of providing both longitudinal and lateral load imbalance data on each car after it passes over the weighing system. To obtain complete load imbalance data, individual wheel weights must be measured and suitably processed. A platform scale will not generate this data. A feature of the present invention using a microcomputer is its capability to accept individual wheel load data and manipulate this data in a variety of combinations and for a variety of uses. Typical uses include the following:

1. Accounting and Billing Purposes
   a. Sum all wheels for total car weight
   b. Sum all cars for total train weight
   c. Sum selected cars, using vehicle identification, for automatic billing
2. Engine and Power Allocation
   a. Sum total consist weight
3. Safety Purposes
   a. Sum the leading and trailing truck weight. If the difference between the two exceeds a predetermined figure, car flagged as warning
   b. Sum wheel weights on each side of a truck and compare. If the difference exceeds predetermined value, car is flagged.

Thus, the weighing of all cars, particularly those which may exhibit some troublesome handling characteristics under certain loading conditions, provides data that is quite useful and not presently available with platform scales. The capability to detect load imbalances may be used to reduce and eliminate dangerous and costly derailments.

A major advantage of the present invention is the ease and minimal cost of the weighing apparatus as compared to conventional scales. Since only a small section of track is actually used in the present invention, costly concrete pits, weighbridges and foundations are eliminated. Only minor modifications are required to install the load bar weighing system of the present invention. Due to the simplicity of the load bar concept and the completely above grade installation, calibration and maintenance is readily and easily accomplished.

BRIEF DESCRIPTION OF THE DRAWINGS

A more complete understanding of the present invention may be had by referring to the appended claims, to the accompanying detailed description and to the drawings in which:

FIG. 1 is a diagram of the system of the present invention partially shown diagram form and partially illustrating certain elements of the system;

FIG. 2 a detailed plan view of the isolated weigh rail track structure shown in block form in FIG. 1;

FIG. 3 front elevation of the isolated weigh rail track of FIG. 2;

FIG. 15 is a front elevational view to an enlarged scale of the measurement end of the load bar assembly with portions broken away to conserve space;

FIG. 16 a view along line 16—16 of FIG. 15; and,

FIG. 17 a top plan view to an enlarged scale of the measurement end of the load bar assembly with parts broken away and in section.

DETAILED DESCRIPTION OF THE INVENTION

Figure 4A:
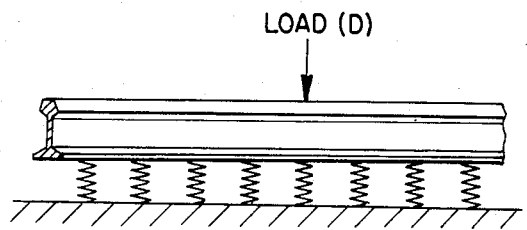
FIG. 4a is a representation of a continuous beam on an elastic foundation as use to analyze the deflection of a continuous track under varying conditions.

An embodiment of the present invention is illustrated in FIG. 1 partially in block diagram form and partly in elements of the system. The basic in-motion weighing system 10 consists of two pair of rail pivot tie plates or blocks 62, a pair of isolated load rail sections 15 and weigh bar 14 with associated transducers 16 and electronics 18 and a microprocessor based data acquisition and processing unit 20. The data acquisition and processing unit 20 includes a signal conditioning unit 22, an analog/digital converter 24 and a microprocessor with data storage 26, the latter having a suitable output such as an RS232 serial port 28. The serial port may be fed to a modem 30 and/or an alphanumeric printer 32 and/or a display device 34 such as a CRT and/or be fed to a mainframe computer 36, all of which make up data output options 38. In essence, the present invention utilizes two short rail sections 15 as weigh beams, each with an instrumented load bar attached thereto. The two short rail sections are contained within an existing track structure 13. The existing track uses the usual rail ties 11 upon a bed of ballast 19. Anytime a wheel rolls over this short section of weigh rail 15, the rail bends slightly. A novel technique is used to measure the amount of bending as a function of weight of the object. The support of the load bar section is designed to permit accurate reproducible data.

The weigh system according to the present invention utilizes an isolated weigh rail track section 15, which avoids the necessity of expensive pits, foundations and/or heavy steel structures as used on typical railroad scales. In the present invention, two isolated rail sections 15 are provided by cutting the rails at spaced positions which are then supported by a mounting means 62 to permit independent bending of the isolated rail sections 15. Measurement of the bending occasioned by a load being placed on the rails 15 is achieved by means of a load measurement bar 14. The load measurement bar 14 itself does not actually carry any load when a rail section 15 is loaded, but merely provides a displacement measurement reference from which the bending slope of a loaded rail section 15 can be determined. The longitudinal length of the rail section 15 is such that only one wheel of the railroad car will effect the bending thereof.

A commonly used technique for analyzing rail deflections considers the rail 13 as a continuous elastic beam uniformly supported by an elastic foundation, FIG. 4a. Although the rail-tie-ballast system represents a discrete series of springs rather than a continuous foundation, the results of theory are essentially in agreement with experimental data for commonly used rail sizes and tie spacings. Accordingly, the static deflection Y of a point X in inches on a beam due to a fixed point load P, can be calculated from the following relationships:

$$y = (P\beta/2K)a(X) \text{ in.} \qquad \text{Equation I}$$

where $a(X) = e^{-\beta X}(\cos \beta X + \sin \beta X)$
$\beta = (K/4EI)^{\frac{1}{4}}$ in.$^{-1}$
K = foundation stiffness, lb/in. per in.
EI = flexural rigidity of the rail, lb.-in.$^2$
X = horizontal distance from point load, P, in.

Figure 4B:
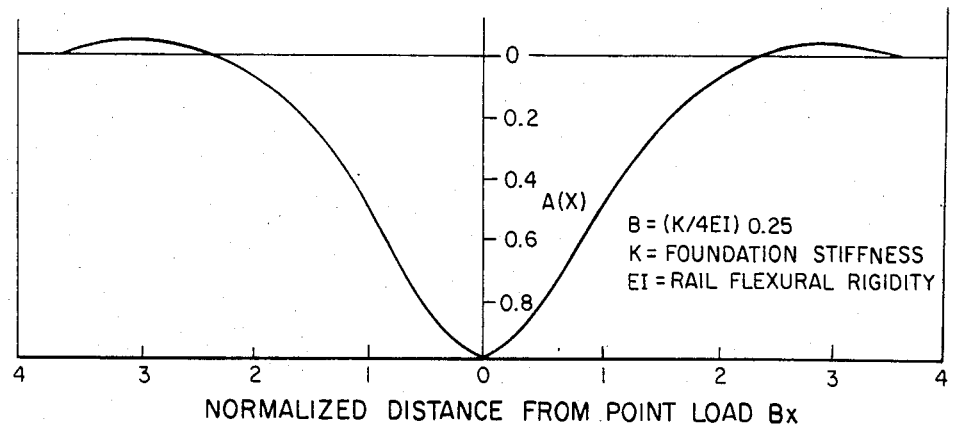
FIG. 4b is a graphical representation of a typical rail deflection curve due to point load P, as a function of normalized deflection distance, $\beta X$.
Figure 4C:
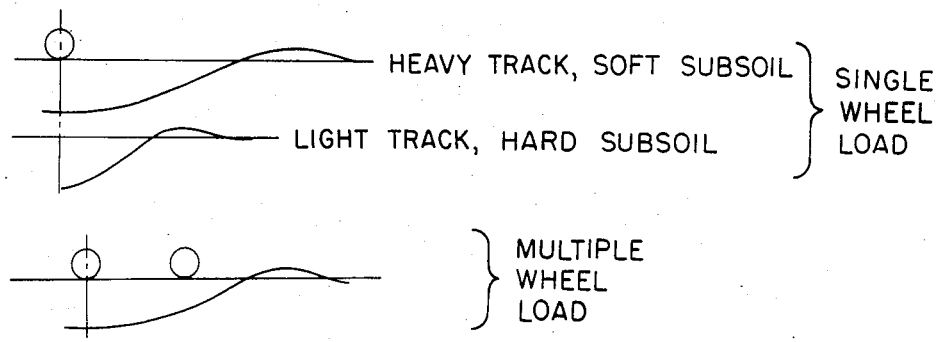
FIG. 4c is a graphical representation of rail deflection as a function of track subgrade for a single wheel load and a multiple wheel load.

Referring to FIG. 4b, there is shown a plot of the normalized beam deflection curve, $a(X)$ versus the parameter $\beta X$. For an average mainline track, the distance from the point load to the point of zero deflection is approximately ten feet; however, as shown in FIG. 4c, the rail deflection curve is quite sensitive not only to load but also to subsoil conditions and multiple wheel loadings.

The length of the wheel base of a railway truck can vary from nearly nine feet to about six feet, therefore, the point load beneath one wheel can produce additional deflection beneath an adjacent wheel and vice versa.

From the above relationships, it is apparent that any measurement technique used to relate rail deflections of a continuous uncut rail to load as produced by a railroad car will be seriously affected by adjacent railroad car wheels as well as by varying track structure support conditions.

An essential feature of the isolated weigh rail is its immunity to adverse loads or deflections. The only condition which causes the rail to bend is where a load is applied between the pivots 39 of pivot bars 40 and 42 supporting the rail 15, FIG. 9, and making up the rail pivot tie plates 62. Thus, any settling or movement of the rail support pivot bars 40 and 42 will not cause the rail to bend or affect the weighment of the railcars. Furthermore, the length of the isolated track section is less than the distance between wheels of the railroad cars to be weighed, such that no more than one wheel can ever be on the weigh rail at one time.

Figures 5, 6:
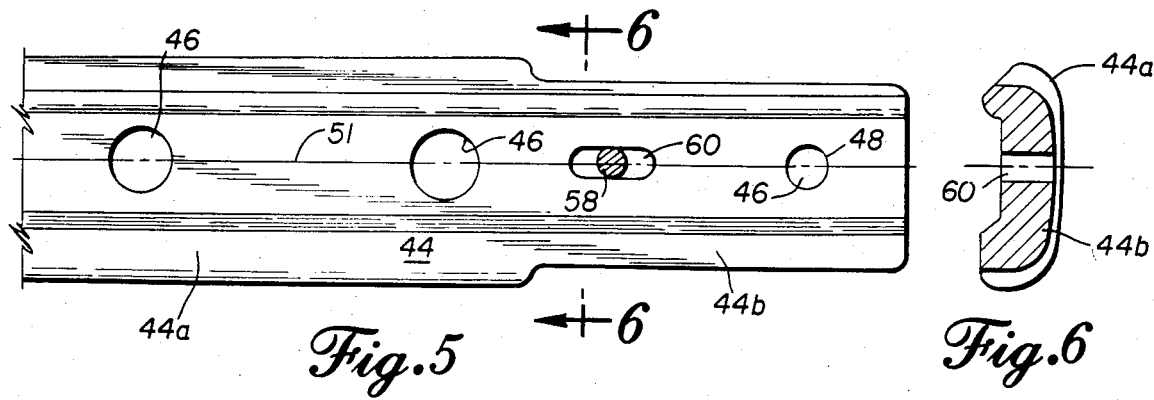
FIG. 5 a front elevation of a joint or safety bar to an enlarged scale.
FIG. 6 is a view along line 6—6 of FIG. 5.

Another essential feature of the track structure of the weighing system according to the invention is the use of a pair of modified joint or safety bars 44, FIG. 5, to secure the weigh rail sections 15 and attached load bars 14 in floating relation to the ends of rails 13. The immodified end 44a of the joint bar 44 is conformed to the shape of the rail to provide a tight fit thereto against the fishing surfaces of the adjoining rails 13. The modified end 44b of the joint bar is sufficiently relieved around the fishing surface of the weigh rail 15 to avoid direct contact. A single high strength safety bolt 46 passes through a tight fit opening 48 in bar 44, then through an opening 50 in the weigh rail 15 and centered on the neutral axis 51 of the rail 15 and then through an opening 52 in a matching joint bar 54 on the opposite side of the rail 15 and secured by a nut 56 or other suitable fastening means. The bolt 46 is used as an absolute containment of the weigh rail 15. Under normal conditions, the weigh rails 15 are effectively unattached to the adjoining rails 13. Under adverse conditions the weigh rails are completely contained by the joint bars 44 and 54. The joint bars 44 and 54 also provide for absolute longitudinal containment of the weigh rails 15. A pair of hardened floating dowel pins 58 are located at the neutral axis 51 of the weigh rail 15, midway between the weigh rail 15 and the adjoining rail 13. The dowel pins are aligned with one received in an elongated slot 60 in the joint bars 44 positioned along the neutral axis, (Webster's Third New International Dictionary, Unabridgeed, G. & C. Merriam Company publishers, Springfield, Mass., Copyright 1966, defines "neutral axis" as "the line in a beam or other member subjected to a bending action in which the fibers are neither stretced nor compressed or where the longitudinal stress is zero"), and keep the weigh rail nominally centered in the longitudinal direction.

The isolated weigh rails 15 are supported by rail pivot tie plate assemblies 62. The basic function of the pivot plates is to provide a fixed and repeatable fulcrum point upon which the rail sections can bend. This is accomplished by rigidly attaching the pivot bars 64 and rail base plate to the rail by means of bolts 82 while allowing the pivot bearing rocker block or base plate 66 to float, so it is self-centering under load.

Throughout the following discussion the terms "neutral axis", neutral line and bending slope are used. Since they are quite crucial to a complete understanding of the invention, a brief discussion of each is presented. This discussion is based upon a standard mechanics of material text, e.g. Popov, Prentice Hall, 1959, Library of Congress Catalog Card No. 52-9944. Consider a rectangular beam element with length L., width W., and height H. simply supported on each end, and a downward load P applied to the beam between the two end supports, the concave surface (top surface adjacent to load) is in compression and convex surface (bottom surface) is in tension. These two surfaces are divided by a neutral plane of zero stress. The intersection of the neutral plane with the face (side surface) of the beam is defined as the neutral line or elastic curve of the beam. The intersection of the neutral plane with a cross section through the beam or with an end surface of the beam is defined as a neutral axis of the beam. The slope (i.e. change in height divided by the change in length)

of the elastic curve or neutral line is considered the bending slope of the beam.

Since a beam will nominally bend about its neutral axis 51, the radius R of the rail pivot bars 64 is selected to be equal to the distance from the neutral axis to the pivot rocker bearing support point 39. This configuration assumes that the predominant relative motion of the rail pivot supports, during bending, is rotation. This rotational motion is accommodated by the rocker bar 64 supported in its mating pivot rocker base plate 66. The rocker bar 64 is received within a recess 68, in the bottom of the rail attachment base plate 79, which restricts the bar against longitudinal movement with respect to the rail and the bar is secured to the rail base plate by bolts 70. The pivot rocker block or rail pivot support 66 is fastened to the bottom of the rail attachment base plate 79 by bolts and disk springs 72 in a manner to permit the pivot rocker bar 64 and the pivot rocker block 66 to self-center upon movement of one with respect to the other. A space 74 or clearance is provided between the bar 64 and block 66 except for the curved contacting support surfaces thereof. It should be noted that the contact surfaces of the block 66 may be coated with a fluorocarbon coating 69 in the contact or bearing area. The coated bearing area provides a low coefficient of friction ($<5\%$) between the rail pivot rocker bar 64 and the pivot rocker support plate 66. This coating minimizes friction and hysteresis which can degrade weighing accuracy. In the preferred embodiment of this invention, nominal rail deflections result in angular movement of the pivot bar 64 of approximately 0.2 degrees or less. Linear motion between the two pivot points is typically less than 0.00015 inch. The support arrangement essentially eliminates any scuffing action of the rail pivot.

The floating pivot rocker base plate 66 tends to self-center the weigh rail 15 as a railcar wheel rolls over the rail. This avoids the adjoining rails 13 from physically interferring with the weigh rail. A further function of the floating pivot rocker base plate assembly 62 is to allow for thermal expansion or contraction as well as shifting of the track structure. Where highly accurate measurements are required, the small variation between fixed pivot bars due to thermal expansion of the weigh rail is automatically accounted for in the microprocessor based data acquisition and processing unit 20.

Nominal sub-base shifting and consequential pivot rocker alignment problems are accommodated by an elastomer pad 76 bonded to the base 86 of the entire pivot plate assembly 62. The elastomer pad serves to damp any vibrations.

Figure 7:
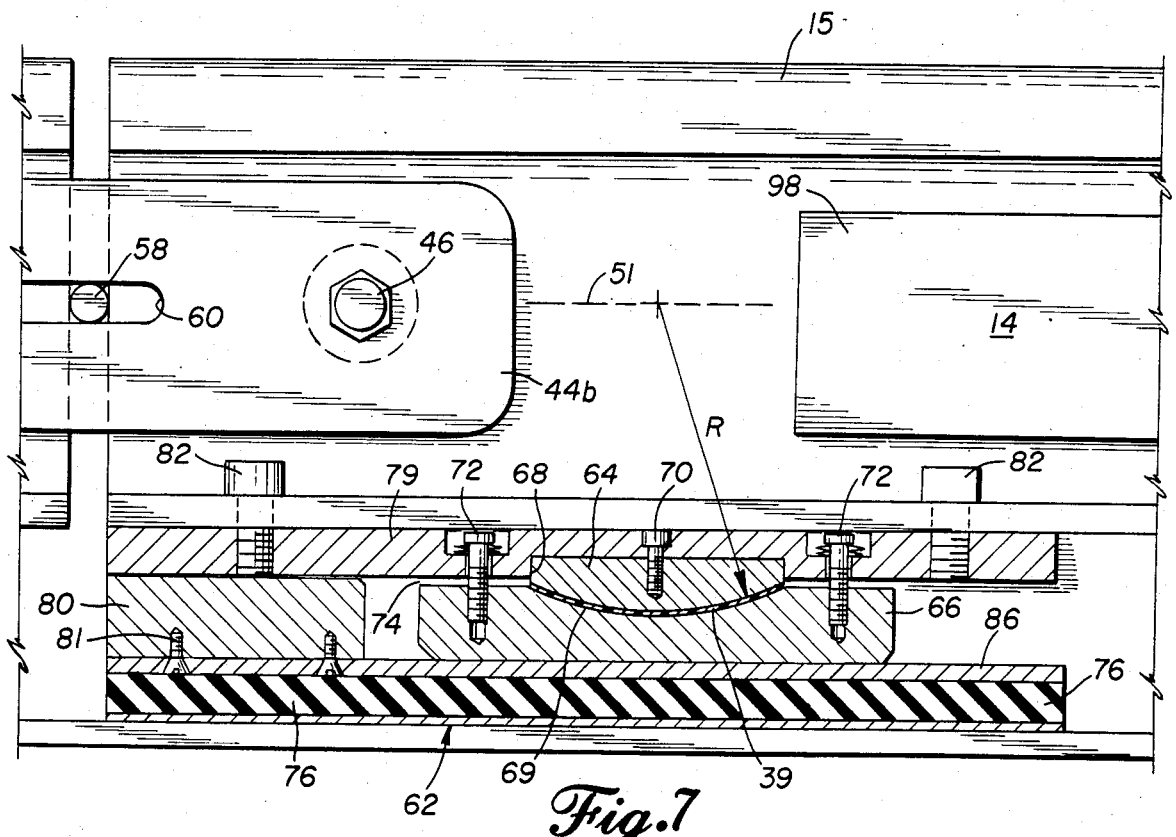
FIG. 7 is an enlarged view of a portion of FIG. 3 partly in cross section, showing the rail pivot plate or block.

Another purpose of the pivot plate assembly 62 is to prevent anti-rotation of the weigh rail section 15 during the entry or exit of a wheel onto the track section 15. Since the rail pivots 40 and 42 of FIG. 9 or more specifically 64 in FIG. 7 is located inboard from each end of the rail 15, anti-rotation support bars 80 are used immediately below each end of the rail 15. The anti-rotation support bars 80 are secured to the pivot plate assembly by means of screws 81 to the sub-base 86 of the pivot plate assembly 62. The support bars 80 prevent cantilevering of the weigh rail 15.

Figure 8:
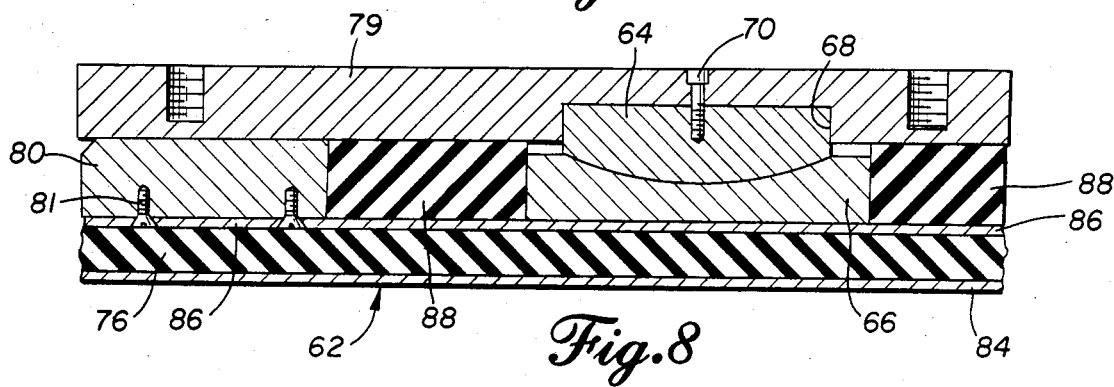
FIG. 8 is a cross sectional view of the preferred embodiment of the rail pivot plate assembly of the present invention.
Figure 10:
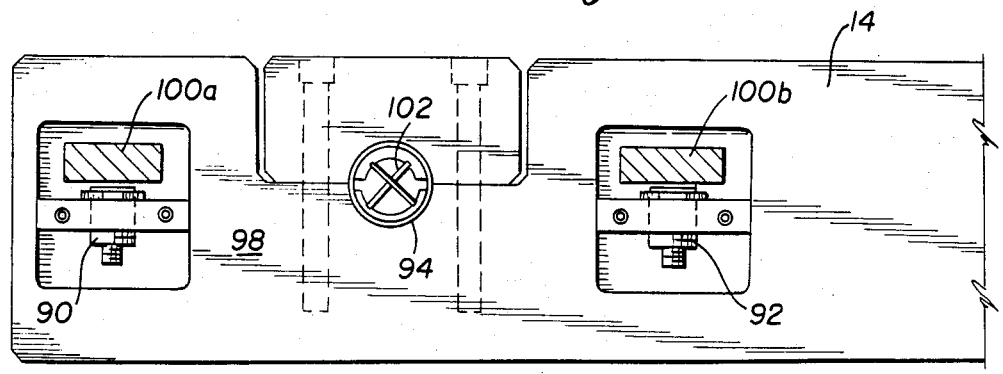
FIG. 10 is a front elevational view of the measurement end of the load measurement bar mounting with portions broken away to conserve space.

The preferred embodiment for the rail pivot plates 62 is best seen in FIG. 8 where the rail base plate 79 and pivot rocker bar 64 together with the pivot rocker block 66, rail anti-rotation pad 80, elastomer base 76 and bottom plate 84 are all molded or encapsulated in a suitable elastomer 88. This assures that the pivot rocker made up of the pivot rocker bar 64 with the pivot rocker block 66 is completely sealed from the adverse environment associated with railroad track structures. The elastomer essentially makes everything between the sub plate 86 and the rail 15 bottom plate 79 an integral and sealed assembly. The elastomer is selected to be sufficiently compliant to allow the rocker pivot block 64 to rotate or slide in the rocker block 66 as the rail 15 bends. The elastomer also allows the rocker block or base plate 66 to translate sufficiently on top of the pivot rocker sub plate 86 so the rail pivot assembly 62 can self-center. The elastomer is also compliant enough to allow the rail base plate 79 to lift off or separate from the anti-rotation support bar 80 as the rail 15 bends between the rail pivot bars 64. The preferred embodiment of the invention allows the complete sealed assembly 62 to be bolted to the weigh rail as one integral unit 62 and secured by bolts 82 to the rail 15.

The rail section support structure 62 allows the weigh rail section 15 to vertically deflect in a repeatable manner with complete freedom and not introduce spurious strains on the rail which are unrelated to any vertical loading.

The present invention also contemplates a novel arrangement for measuring the amount of bending occasioned in a weigh rail by a load, such as a wheel, applied to the isolated section of the rail 15. Since the weigh rail bends about its neutral axis, all measurements are made at or as near the neutral axis 51 as possible. A measurement bar 14 is provided to precisely measure the amount of bend that occurs when a wheel passes over the weigh rail. The weigh device or load measurement bar 14 is mounted on the isolated weigh rail 15 by means of two connections acting through the rail neutral axis to minimize measurement outputs, that are unrelated to vertical loads, applied by a wheel.

Figure 9A:
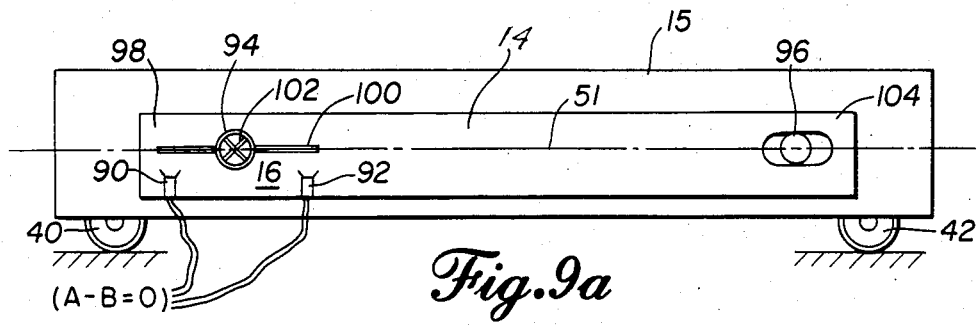
FIGS. 9a and 9b are schematic diagrams of the rail mounted load measurement bar unloaded and loaded, respectively.
Figure 9B:
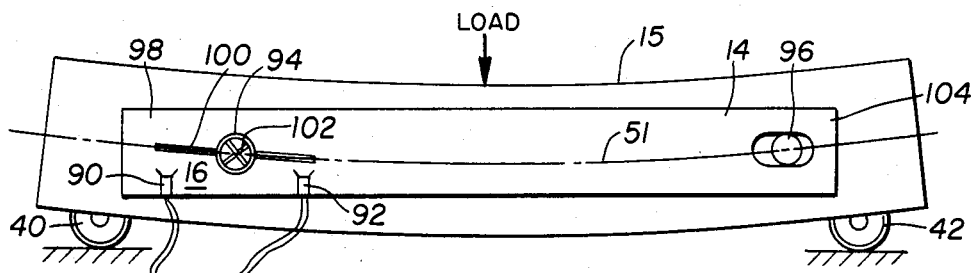

The basic measurement principle is illustrated diagrammatically in FIGS. 9a and 9b. A pair 16 of displacement sensors 90 and 92 are affixed to the non-load bearing measurement bar 14. For purposes of explanation, the bar 14 is supported at each end through a bolt 94 and a pin 96 passing through the web 128 at the neutral axis of the weigh rail 15. At the measurement end 98 of the measurement bar, a target 100 in the form of a conductive plate or planar displacement responsive means is attached to bolt 94, as will be explained, holding the bar 14 to the rail 15. As shown in FIG. 9a, under no load conditions, sensors 90 and 92 are positioned to be equidistant from the target or metal object 100. Since the output from sensors 90 and 92 are differenced, the net output is zero. While sensors other than differential sensors may be used, the sensors that are preferred are those forming the subject matter of U.S. Pat. No. 4,160,204, assigned to the same assignee, the contents of which is incorporated by reference herein.

When a load L is applied to the top of weigh rail 15, the center of the rail 15 bends in a downwardly direction, FIG. 9b, while the weigh bar 14, on which sensors 90 and 92 are affixed, retains its straight position along the no-load neutral position of rail 15. When the rail 15 bends, the target 100 is rotated about the axis of bolt 94. The target is mounted on bolt 94 with the axis of bolt 94 passing through the center of the target 100 to provide equal target area to either side of the center. When the target is rotated from its neutral position along the neutral axis of the rail 15 as maintained by the measurement bar 14, the sensors 90 and 92 are unequally displaced from the target ends 100A and 100B such that the differenced sensor outputs provide a measurement signal which is proportional to an amount of bending which is a function of the applied load.

Basically, the load measurement bar 14 provides a neutral axis, zero load, position reference from which to measure rail deflection as a function of load. With the load measurement bar 14 being fastened at two points on the weigh rail 15, this results in providing a relative displacement measurement. The difficulties associated with making a displacement measurement with respect to some absolute reference are therefore eliminated. This is in contrast to some types of scales which rely upon reaction structures and carefully adjusted load cells to achieve a measure of accuracy. Further, since the measurement bar is not subjected to loads other than its own weight, it is less sensitive than other types of scales to daily abuse caused by routine shocks, load imbalance and overloading.

In the preferred embodiment of the present invention, one end of the weigh bar 14 identified as the measurement end 98 is rigidly attached to the rail section 15 via a flex coupling 102, such as the Free-Flex pivot, manufactured by the Bendix Fluid Power Division of the Bendix Corporation, 211 Seward Avenue, Utica, N.Y. 13503 as set forth in Pub. No. 00U-6-831A. The coupling 102 is a bearing with limited travel. The flex coupling provides only one degree of freedom between the weigh rail 15 and the attached weigh bar 14, namely rotation. The relative motion is a direct measure of the bending slope of the rail which in turn is proportional to the load applied to the weigh rail.

The output from the weigh bar is determined by applying basic beam equations pertaining to mechanics of materials. Using the conjugate beam method of successive integration, for elastic deformation of a simply supported beam, the slope of the beam as a function of a load can be expressed as:

$$\theta = (PL^2/16EI) \quad \text{Equation II}$$

where:
$\theta$ = beam slope (rad)
P = concentrated load on beam (lbs)
L = length of beam between supports (IN)
E = beam material modulus of elasticity (psi)
I = moment of inertia about beam neutral axis (IN$^4$)

From kinematic relationships, the relative displacement between the weigh rail 15, fixed target bar 100, the measurement bar 14, and sensors 90 and 92 is:

$$\delta = R \tan \theta \quad \text{Equation III}$$

where:
$\delta$ = deflection of target bar with respect to the sensors (IN)
R = distance of sensors from the pivot point of the measurement bar with respect to the target bar (IN)
$\theta$ = beam slope (degrees)

Figure 11:
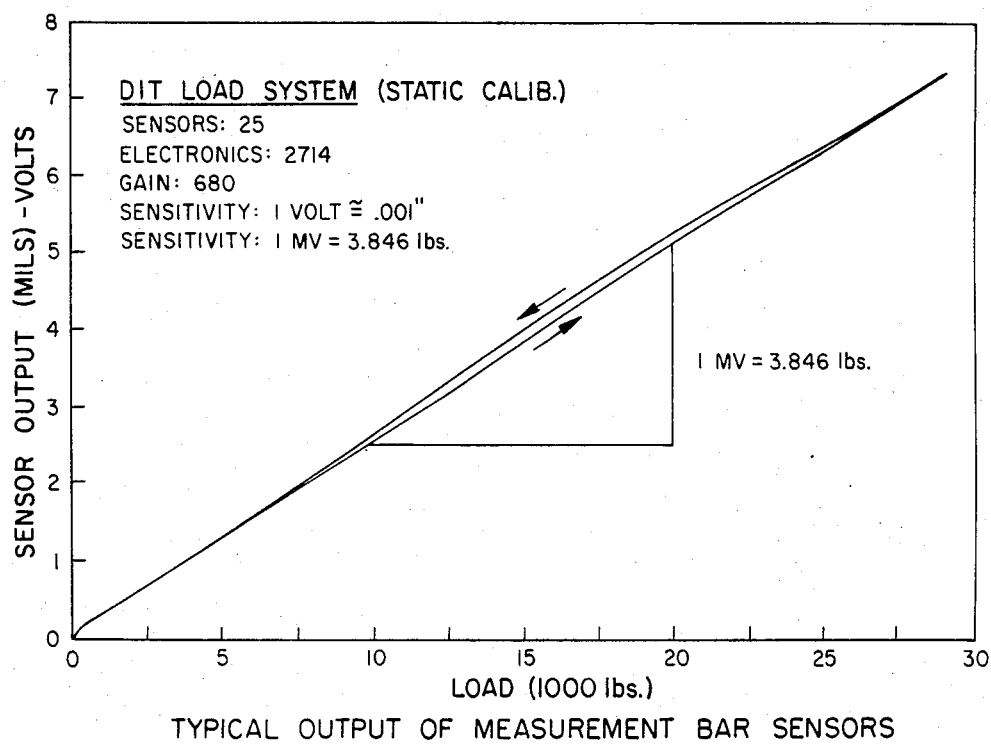
FIG. 11 is a graphical representation of the typical output of the load measurement sensors as a function of load.

For a typical measurement bar configuration, this results in an output sensitivity, as will be further explained, of 1 mv = 4 to 8 pounds load. Typical test data is shown in FIG. 11.

Since the deflection measurements needed to measure bending slope are relatively small, from about 0 to about 0.005 inch, the flexural pivot 102 is a very key component of the measurement bar assembly. The cross-spring flexural pivot provides a frictionless, low backlash oscillating bearing with a relatively high stiffness in both the transverse and axial direction. Further, the pivot 102 preferably has no rubbing parts, thereby eliminating the requirement for lubrication and the causes of wear, performance, deterioration, and contamination problems. The most significant requirement is that the pivot has the capability to maintain precise angular tolerances during oscillation. This is desirable to provide exceptional repeatability and accuracy over extended periods of time.

Figure 12:
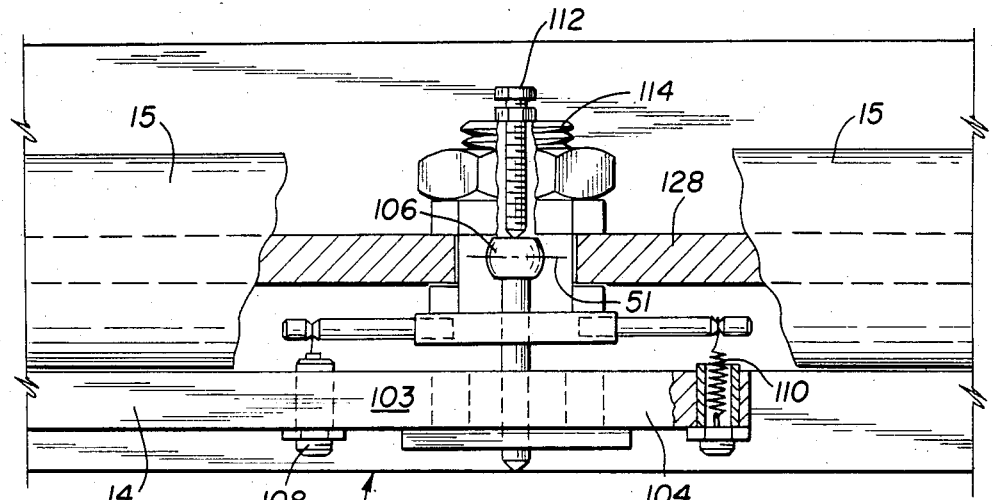
FIG. 12 a top plan view of the control end portion of the isolated weigh rail track with portions thereof broken away to conserve space and portions in cross section.
Figure 13:
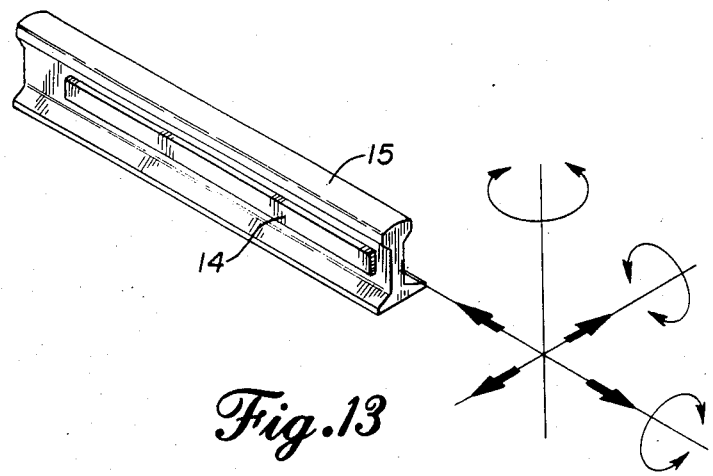
FIG. 13 is an illustration of the degrees of freedom of the control end of the measurement bar provided by the present invention.

The second point 96 of the control attachment 103 of the measurement bar 15 to rail 14 is at the end opposite the measurement end 98 identified as the control end 104. The control end of the bar is affixed to the rail section 15 by a control ball 106, FIG. 12, positioned on the neutral axis of the rail 15. This control ball allows the rail section 15 to move with four degrees of freedom about the control ball. Also the control end 104 of the measurement bar 14 has four degrees of freedom. The attachment arrangement 103 minimizes erroneous strain introduced locally in isolated rail section 15 which are not related to vertical load, such as twisting and the like. Two pair of lateral preload springs 108 and 110 keep the measurment bar laterally contained against a lateral position adjustment bolt 112. The control ball 106 is retained within a rail attachment bolt 114 which attaches to the rail.

The measurement of the amount of the rail loading is accomplished preferably by means of a pair of differential impedance transducers 90 and 92 such as disclosed and claimed in U.S. Pat. No. 4,160,204, FIG. 15, mounted directly to the measurement bar. The differential impedance transducers 90 and 92 use the principle of impedance variation resulting from eddy currents induced in a conductive target 100 located on and responsive to the bending of the rail section 15. The target is mounted to provide for a portion of each end thereof to be near a sensor. The amount of the electromagnetic coupling between the coil of each sensor and the adjacent portion of the target is dependent upon the gap between the sensor coil and the target. Since the target 100 is mounted to pivot about a point midway between the sensors, one end of the target will move closer to its respective sensor and the other end will move further away.

Figure 14:
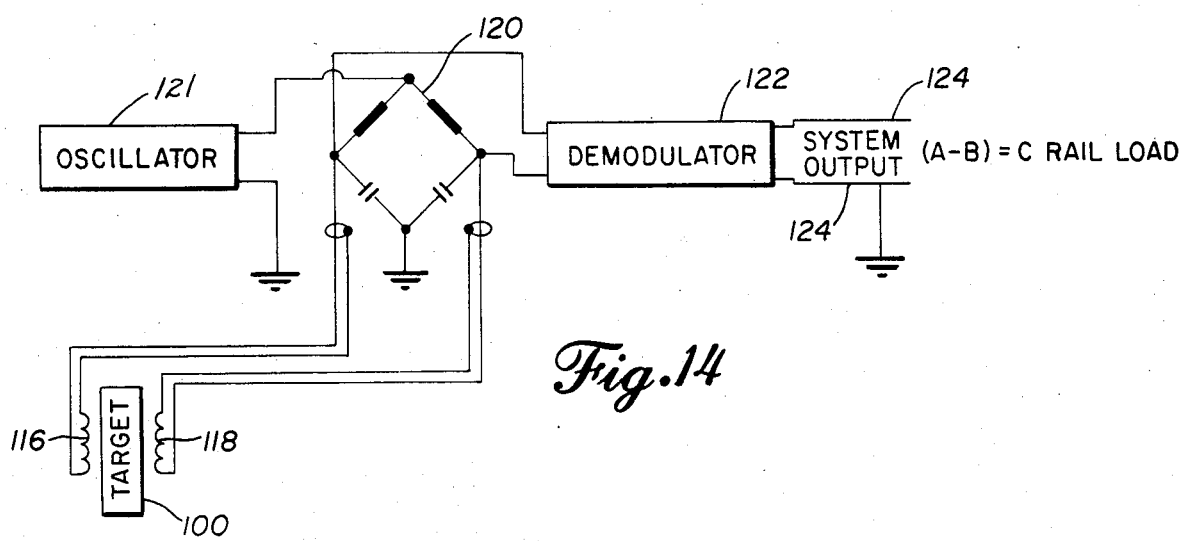
FIG. 14 is a diagram of the electrical measuring system of the present invention partially shown in block diagram form and partially illustrating certain circuit elements of the system.

The coils 116 and 118 of the pair of sensors shown are electrically connected to the opposite legs of an instrumentation AC bridge 120, FIG. 14 driven by oscillator 121. The bridge is balanced and the differential output is zeroed when the sensors are at equal distances from the target with no load on the rail section 15, FIG. 9a. When a load is placed on the rail section 15, FIG. 9b, this causes one end of the target 100 to be rotated to move away from one sensor while the other end is caused to move toward the other sensor and the magnetic coupling between each sensor and its associated target are no longer equal. This results in an imbalance in the bridge 120. The bridge imbalance is reflected in the output from the bridge which is amplified and demodulated in an amplifier demodulator 122 and presented to the system output 124 as a linear analog signal directly proportional to the vertical load applied to the rail segment 15.

By means of the above design, one avoids the need for intervening summation amplifiers and the additional noise and drift occasioned by their use. Through the use of a differential configuration, an extremely high degree of resolution is obtainable. The displacement sensors used are capable of resolving 2.5 angstroms or better, that is, at least 0.000,000,004 inch. Also detrimental effects caused by temperature, mechanical anomalies, cables, and the like are either greatly reduced or eliminated.

The configuration of the measurement bar 14 provides several advantages. Significant is the compact and concentric mounting of the sensors 90 and 92, the sensor target 100 and the flexural pivot 102 all with respect to the measurement and weigh rail attachment bolt 94. Since the control end 104 of the measurement or weigh bar 14 essentially allows the bar 14 complete freedom of motion except in the vertical or load direction, any displacements sensed by the sensors are primarily those induced through the measurement end attachment bolt 94 and nut 126. Thus, localized displacements of the weigh rail which are unrelated to vertical loading are minimized. Further, since the target bar 100 is concentrically clamped to the attachment bolt 94, this provides a convenient means of adjusting the mechanical zero to zero the target bar 100 relative to the sensors 90 and 92 mounted on measuring bar 14. The arrangement according to the invention allows the accommodation thereof within the web portion 128 of the rail without interfering with the track structure.

Further, the mounting of the weigh bar 14 with respect to sensor target bar 100 mounted on the rail segment 15 introduces a mechanical advantage in terms of increasing the relative displacement being measured, thereby increasing the load measurement sensitivity and resolution.

While there have been described what at present are considered to be the preferred embodiments of the invention, it will be obvious to those skilled in the art that various changes and modifications may be made therein without departing from the invention. It is aimed, therefore, in the appended claims to cover all such changes and modifications which fall within the true spirit and scope of the invention.

What is claimed is:

1. A weighing apparatus including:
    a section of isolated track rail separated and spaced at each end from the track rails of a railroad track;
    means supporting the isolated track adjacent the ends thereof to permit the isolated section to bend along the neutral axis thereof in response to a vertical load being applied thereto;
    motion sensing means operatively mounted upon said section of isolated track rail adapted to sense and measure the amount of bending of the neutral axis of the isolated track rail and produce an electrical output signal; and,
    system means for developing an output from said output signal which is a function of the amount of vertical load applied to the isolated track rail;
    wherein the rail support of the isolated section of track includes a pair of bearing means having a convex bearing surface attached to the isolated rail with the bearing surface thereof having a radius of curvature centered on the neutral axis of the rail and a bearing plate, adapted to provide earth support, having a concave bearing surface mating with said convex bearing surface to provide self-centering pivots for the isolated track rails.

2. A weighing apparatus including:
    a section of isolated track rail separated and spaced at each end from the track rails of a railroad track;
    means supporting the isolated track adjacent the ends thereof to permit the isolated section to bend along the neutral axis thereof in response to a vertical load being applied thereto;
    motion sensing means operatively mounted upon said section of isolated track rail adapted to sense and measure the amount of bending or the neutral axis of the isolated track rail and produce an electrical output signal; and,
    system means for developing an output from said output signal which is a function of the amount of vertical load applied to the isolated track rail;
    wherein the motion sensing means includes a weigh bar mounted on the section of an isolated track rail and secured thereto along the rail neutral axis with one end thereof, the control end, being mounted for movement with four degrees of freedom and the other end, the measurement end, being mounted with a single degree of freedom of movement and sensor means for sensing relative movement between said rail and said weigh bar in said single degree of freedom as a function of the load applied to said rail.

3. A weighing apparatus according to claim 2 wherein the motion sensing means comprises a pair of differential impedance transducers mounted in spaced relation along the length of said weigh bar and a pair of targets mounted in spaced relation along the length of said isolated rail in confronting relation to the transducers which on bending movement of said rail causes the target confronting one transducer to move closer to one transducer and the other target to move away from the other transducer to provide an output proportional to the relative movement of said rail with respect to said weigh bar.

4. A weighing apparatus according to claim 1 wherein the motion sensing means comprises a pair of differential impedance transducers mounted in spaced relation along the length of said weigh bar and a pair of targets mounted in spaced relation along the length of said isolated rail in confronting relation to the transducers which on bending movement of said rail causes the target confronting one transducer to move closer to one transducer and the other target to move away from the other transducer to provide an output proportional to the relative movement of said rail with respect to said weigh bar.

5. A weighing apparatus according to claim 1 wherein the motion sensing means includes a weigh bar mounted on the section of an isolated track rail and secured thereto along the rail neutral axis with one end thereof, the control end, being mounted for movement with four degrees of freedom and the other end, the measurement end, being mounted with a single degree of freedom of movement and sensor means for sensing relative movement between said rail and said weigh bar in said single degree of freedom as a function of the load applied to said rail.

6. A weighing apparatus according to claim 3 wherein the length of the isolated track rail is less than the distance between wheels of the load to be measured.

7. The apparatus of claim 1 wherein the bearing surfaces have a fluorocarbon coating thereon.

8. In a railroad car weighing apparatus:
    a relatively short section of railroad track supported at each end and isolated at each end from the main track;

target means attached to said rail section at a pivot along the neutral axis adapted to produce rotary movement of the target in response to a load vertically applied to said rail section; and, sensor means adapted to respond to the rotary movement of the target and produce an output representative of the load applied to the said rail section.

9. The weighing apparatus of claim 8 wherein the rail section length is less than the track distance between wheels.

10. The weighing apparatus of claim 8 wherein the support for the rail section includes a pair of bearing means having a convex bearing surface attached thereto with the bearing surface thereof having a radius of curvature centered on the neutral axis of the rail section and a bearing plate, adapted to provide ground support, having a concave bearing surface mating with said convex bearing surface to provide self-centering pivots for the ends of the isolated track rails.

11. The weighing apparatus of claim 8 including a weigh bar positioned along the neutral axis of the rail section and fastened at one end thereof for movement of the rail section in four degrees of freedom and the other end mounted for a single degree of freedom indicative of a load applied to the rail section and the sensor means comprises a pair of differential impedance transducers mounted in spaced relation along the length of the weigh bar and the target comprises a pair of metal vanes mounted in confronting relation to the transducers which on bending movement of the rail section causes the target vane confronting one transducer to move closer to the one transducer and the other target to move away from the other transducer to provide an electrical output proportional to the relative movement of the neutral axis of the rail section with respect to said weigh bar.

12. A motion sensing apparatus according to claim 2 wherein the motion sensing means is mounted to any load bearing structural member for purposes of measuring the load transmitted either directly or indirectly to the said structural member.

13. In a method of weighing a vertical load applied to a section of railroad track which comprises the steps of:
 isolating a section of railroad track from adjacent track loads;
 mounting an elongated member on the web of each isolated weigh rail coincident with the neutral line of each rail, at rest, said mounting being non-load bearing with respect to rail loads and adapted to allow the elongated member to measure the bending slope of the rail along the neutral line;
 providing an earth support adjacent each end of the isolated track having a bearing whose surface follows a radius of curvature centered on the neutral axis of the rail; and,
 measuring the bending slope of the neutral line of the rail which when compared with the non-load bearing elongated element represents a function of the vertical load applied to the isolated rail section.

* * * * *